United States Patent [19]

Mizzi et al.

[11] Patent Number: 4,620,062
[45] Date of Patent: Oct. 28, 1986

[54] DEVICE FOR FORMING SIGNALS WHICH ARE CHARACTERISTIC OF THE POSITION OF A POINT DETERMINED ON A SURFACE

[75] Inventors: Francois Mizzi, La Celle St Cloud; Jean-Louis Bellon, Paris, both of France

[73] Assignee: RDI Limited Partnership, Wilmington, Del.

[21] Appl. No.: 659,526

[22] Filed: Oct. 10, 1984

[30] Foreign Application Priority Data

Oct. 11, 1983 [CH] Switzerland .................. 5563/83

[51] Int. Cl.⁴ ............................................. G08C 21/00
[52] U.S. Cl. ......................................... 178/18; 178/20
[58] Field of Search .............................. 178/18, 19, 20; 340/706, 709, 720, 724

[56] References Cited

U.S. PATENT DOCUMENTS

| | | | |
|---|---|---|---|
| 3,304,612 | 0/1967 | Proctor et al. | 33/1 |
| 3,588,345 | 6/1971 | Dym | 178/18 |
| 3,911,215 | 0/1975 | Hurst et al. | 178/18 |
| 4,066,853 | 0/1978 | Zenk | 200/5 A |
| 4,444,998 | 0/1984 | House | 178/19 |

FOREIGN PATENT DOCUMENTS 0054406 of 1982 European Pat. Appl. .
0085012 of 1983 European Pat. Appl. .
1537435 of 1968 France .
1201424 of 1970 United Kingdom .
2046450 of 1980 United Kingdom .

OTHER PUBLICATIONS

IBM Technical Disclosure Bulletin, Analog Data Tablet, J. F. Hevesi, vol. 23, No. 2, Jul. 1980, pp. 666–667.

Primary Examiner—Stafford D. Schreyer
Attorney, Agent, or Firm—Cushman, Darby & Cushman

[57] ABSTRACT

The device consists of two superimposed substrates (1 and 5) each carrying a grid of orthogonal conductive tracks (2 and so forth) facing each other from grid to grid and kept at a distance from each other by spacing rods (4). The tracks of each grid are attached to linear resistances ($R_{AX}$ and $R_{AY}$) designed to be simultaneously connected, one to a direct-current reference potential and the other to a potential sensor, and conversely. This sensor can thus receive analog signals which are characteristic of the position of any point on the substrate (5) which is formed by a soft membrane, on which substrate a pressure is exerted which puts at least one track (6) of the grid associated with this substrate (5) into contact with one track (2) belonging to the grid associated with the other substrate (1).

16 Claims, 6 Drawing Figures

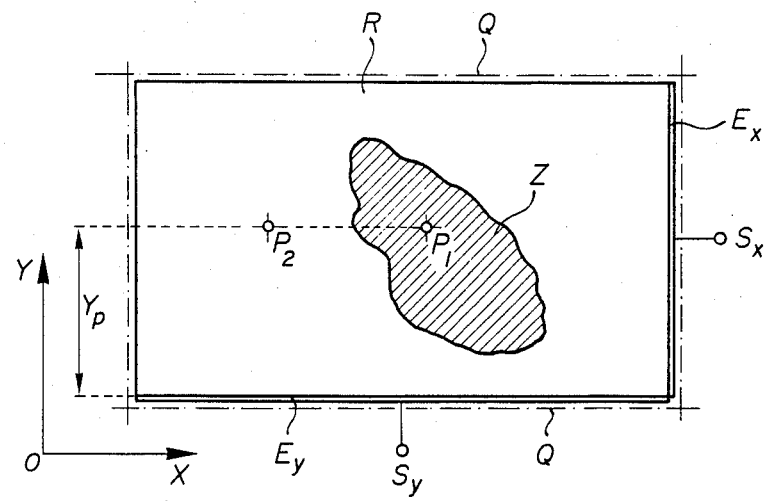
FIG. 1
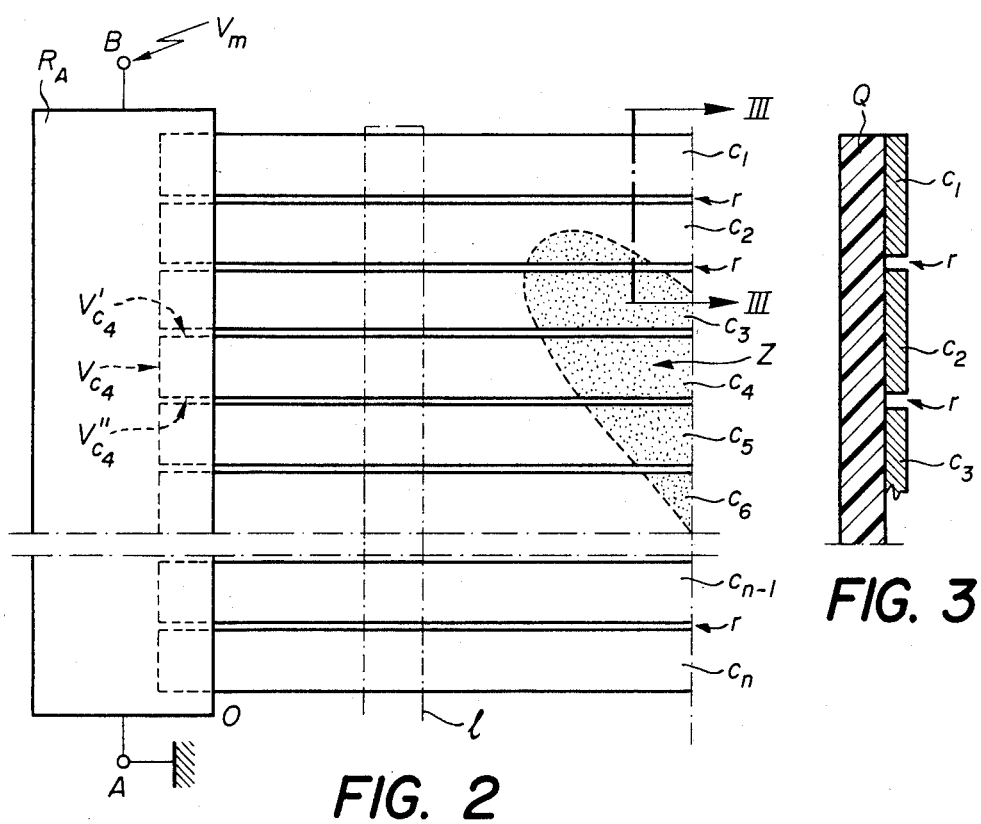
FIG. 2
FIG. 3

DEVICE FOR FORMING SIGNALS WHICH ARE CHARACTERISTIC OF THE POSITION OF A POINT DETERMINED ON A SURFACE

The present invention relates to a device for forming signals characteristic of the position of a point determined on a given surface, especially by pressure exerted at right angles to this point.

A device of this type is already known, in particular from U.S. Pat. No. 4,444,998, which comprises a first, so-called static, membrane of a material having a relatively high ohmic resistance and generally rectangular shape and uniformly covering the said surface, a soft so-called dynamic membrane placed on top of the static membrane, the face opposite to the dynamic membrane of which is coated with a conductive layer, this dynamic membrane being held by appropriate means at a distance from the static membrane which is sufficient for preventing any inadvertent contact between its conductive coating and the static membrane and being capable of resuming the distant position after having been deflected from it, for example after a pressure has been exerted on a point on its surface with a view to creating a local electric contact between the dynamic membrane and the static membrane.

In such a device, the edges of the latter membrane are held pair to pair at a direct-current reference potential in such a manner that any point of the conductive coating of the dynamic membrane coming into contact with the static membrane under the above conditions is itself brought to a potential corresponding to this same reference potential, reduced by the drop in potential registered in the static membrane between one and the other pair of its opposite edges and this point of contact. The "geographic" position of this point is determined by sequentially measuring, from the dynamic membrane, the value of the apparent resistance offered by the part of the static membrane extending between its point of contact with the dynamic membrane and one or the other of the adjacent sides of the edge of the static membrane. This measurement is made possible actuating four electrodes arranged along the four sides of the static membrane and electrically connected to the opposite sides of the said membrane and by alternately connecting each pair of electrodes extending along opposite sides of the static membrane to separate voltage sources in such a manner as to create orthogonal potential gradients in the said membrane.

Nevertheless, a device of this type does not allow the position of the points of the dynamic membrane touched by a user to be determined with sufficient accuracy as the errors registered can attain a value of several centimeters, depending on the case. This type of disadvantage occurs, in fact, as a result of two distinct reasons, one being inherent in local differences in homogeneity of the thickness and of the chemical nature of the material constituting the static membrane and thus in the differences of the ohmic resistance locally offered by each point on the membrane and the other being inherent in the geometry of this membrane and of the electrodes supplying it with current, resulting of necessity in a different distribution of the lines of current flowing through the membrane and thus in a difference in the length of these lines and in the electric resistance offered by the membrane in accordance with the location of the point of contact of the dynamic membrane with the static membrane.

The above disadvantage cannot even be suppressed by making use of membranes with the most modern structure, that is to say in which the resistive coating consists of a layer of extremely thin and transparent metal oxide, for example an indium oxide, a tin oxide or a mixture of the two.

Indeed, it is known that even that most sophisticated techniques for depositing such oxides, such as plain vapor deposition or deposits arising from using the well-known technique applied, for example by the Sierracin Corporation, produce results which are the less constant for the fact that the thickness of the desired coatings is very thin and the extent and speed of fabricating such coatings is great and that particularly the quality of these coatings becomes degraded with time by mechanical wear due to repeated friction between the static and dynamic membranes of the devices with which they are integrated, during the utilization of such devices.

In U.S. Pat. No. 3,304,612 and European Patent Application No. 0,054,406 devices are also described which operate in a similar manner to the above device.

From French Patent No. 1,537,435 a device of the type mentioned in the preamble is also known which comprises two orthogonal grids of equidistant tracks constantly kept at potentials having the same value but opposite signs and applied to one first end of each track of one grid under consideration, the second end of these tracks being joined to an electronic "gate", one to each track, supplying a signal the amplitude of which is characteristic of the position occupied by this track within its grid when the potential of the second end of the track becomes zero following a momentary contact of this track, the first end of which is at a potential having a given sign, with another track which is orthogonal to it and which itself is at the same potential but of opposite sign.

Although the principle utilized in this French patent effectively allows a point on a surface enclosed by two grids of tracks to be satisfactorily located, it can be understood that such a device would of necessity lead to a particularly costly structural complication if it were to be applied in a device using grids with particularly numerous tracks of unit width and very small spacing. Indeed, it is easy to imagine the particularly high number of electronic "gates" and of the connections which must be made in order to obtain the required analog signal.

British Pat. No. 1,201,424 relates to a later development of the above device according to which the orthogonal grids of conductive tracks are subjected to the action of a pulse generator which feeds these grids with periodic signals which are phase-shifted in time from grid to grid, the tracks occupying one and the same position, in the X and Y direction from grid to grid, both lots being linked to a logic element, one per track, which stays inert as long as it receives the out-of-phase signals from track X and track Y relating to it and emitting an output signal when one of the two input signals changes in character, particularly because one or the other of the two tracks of the grid has been brought into contact with another track in such a manner that the out-of-phase signal flowing through the said other track is superimposed on its own signal.

Detection of the output signals emitted by the two logic elements concerned should in principle allow the two tracks of the two grids brought into contact to be identified. Nevertheless, if the point to be located, on which a pressure has been exerted putting one track of one of the grids into mutual contact with one track of the other grid, has an ordinate and an abscissa of the same value, the device described is incapable of locating this point because, whilst being different from the periodic signals received by these tracks being brought into mutual contact, the signals received by the logic element to which these tracks are connected will be identical for each track and will correspond on each of them to the superimposition of the two original signals, phase-shifted in time. Therefore, this logic element will stay "inert" and nothing will indicate to the analysis circuit of the device that the two tracks in question have been brought into contact. To this disadvantage should be added the fact that the structure of these analysis circuits presupposes a particularly complicated and costly electronic "logic" to be brought into operation.

In various American patents belonging to the Control Data Corporation and particularly in U.S. Pat. No. 4,066,853 a device has likewise been proposed which also uses two grids of conductive tracks defining a system of orthogonal coordinates, these tracks consisting of coatings of a metallic oxide of the type also used in the present invention for those of one grid and of coatings of gold for the tracks of the other grid. In addition to using a conventional insulation arranged between the two grids of tracks facing each other, the device proposed in these American patents uses a piezo-resistant coating interposed between the grids in such a manner that it offers a resistance which is sufficient to prevent under normal circumstances any current from flowing between the tracks of one grid and those of the other grid, this flow becoming possible, on the other hand, when this coating is locally subjected to a pressure of given intensity between the tracks of one grid and the other crossing in the vicinity of the zone in which the said pressure is exerted. As the value of the current which can flow in the tracks thus momentarily "linked" is clearly independent of the "geographic" position of these tracks within the respective grid, the device under consideration is therefore a device which functions digitally. In the fashion of the analog device previously mentioned, the existence is therefore presupposed of a particularly high number of connections allowing the different conductive tracks of the two grids of tracks to be switched to the "means" for "scanning" such tracks. Such a structural disadvantage can only be eliminated by limiting the number of tracks of each grid for a given coated surface so that the width of these tracks is then relatively large (of the order of more than one centimeter in the American patents quoted) and the resolution of such a device then becomes bad.

Besides, it is clear that the previously mentioned disadvantages which are associated with the non-homogeneities in thickness and in the quality of the metal oxide coating constituting each track are also noticeable here, considering the great width of these tracks and because these tracks are designed for passing a current signal and are therefore particularly susceptible to variations in resistivity likely to exist from track to track. It is the same with regard to the inherent disadvantages of degradation with time of the conductive tracks and more particularly of those consisting of a coating of precious metal, such as gold, which is known to offer poor mechanical resistance, in particular to wear.

It should also be noted that the scanning means mentioned above themselves also present a relatively complex and costly structure.

U.S. Pat. No. 3,304,612 also relates to a device for forming signals which are characteristic of the position of a point on a surface, comprising, for example, two orthogonal grids of conductors arranged one by one at the bottom of a plurality of corresponding grooves recessed into a support plate of soft material for each grid and facing an electrode associated with each set of conductors, the electrode consisting for example of a thin metal film. The conductors of each grid are each fed by a different potential which is characteristic of their individual position within the corresponding grid by virtue of a voltage divider associated with each grid of conductors.

The position of the point on the surface on which a pressure is exerted is thus determined by measuring the value of the voltage appearing at each of the two electrodes of the device following the contact of the two conductors belonging to the two grids of the device with the respective electrode In a particular variant, the device has only one electrode which is sandwiched between the two grids of conductors and which can thus indifferently work in conjunction with either of these grids. The two coordinates of the point sought are in this case not measured simultaneously as in the preceding case but alternately Clearly this device is structurally very complicated. It also has a particularly large "overall" thickness and uses one or two films which are of metal and therefore opaque, so that it is impossible to use such a device particularly as a keyboard designed to be placed on top of an LCD display used, for example, to indicate to the user which parts of the device are to be activated for controlling a particular function.

It is also not easy to see how the architecture proposed in this patent would be capable of ensuring that the device will operate correctly over a very large period whilst continuing to produce results of optimum accuracy.

From French Pat. No. 8,007,160 a device is also known for forming signals which are characteristic of the position of a point on a surface, comprising two orthogonal grids of conductive tracks which are separated between grids by a piezo-resistive membrane and in which device the tracks of one grid are attached at one end to various points of a calibrated resistance. The position of the point sought, on which a pressure is exerted which is sufficient for the electric resistance of the membrane to become low enough to allow a current to flow between two tracks of the grids crossing in the vicinity of this point, is obtained by linking each end of the two resistances to a source of constant-intensity current and by measuring the distribution of this current at these ends of the resistances. A quite complex electronic circuit allows the coordinates of the point sought to be calculated from the values of the above various currents.

The measuring accuracy of such a device depends greatly on the electric properties of the piezo-resistive membrane and of the material constituting the conductive tracks of the two grids and on the consistency of these properties over the whole extent of their surface. Indeed, these elements are naturally designed to carry a current signal in such a manner that any variation induced by the resistance to the flow of this current translates into a measurement inaccuracy. In addition, this device, like the preceding one, is opaque, the piezoresistive membrane being of rubber and the conductive tracks being formed by metal bands, for example of copper.

The present invention allows all of the disadvantages mentioned to be eliminated. It also has the aim of obtaining a device which has a particularly simple architecture, allowing any point on a given surface on which a manual or non-manual pressure has been exerted, even of low intensity, to be located with a particularly high degree of accuracy, of the order of a millimeter or less, with a minimum of reliable means. Besides, this architecture is advantageously but not exclusively made of transparent material of very good optical quality, in such a manner that the device according to the invention is particularly adapted for use in a position on top of a display device consisting of a cathode ray tube or of a liquid-crystal display, for example.

For this purpose, the present invention proposes, as in certain documents of the prior art, a device for forming signals which are characteristic of the position of a point determined on a surface, particularly by pressure, manual or not, exerted at right angles to this point, comprising a first insulating substrate covering the surface, a first grid of conductive tracks placed on one face of this first substrate and spaced apart from each other, a second substrate of soft insulating material, covering the face of the first substrate carrying the said conductive tracks, a second grid of conductive tracks placed on the face of the second substrate located opposite to the first grid of tracks, the tracks of this second grid being spaced apart from each other and extending transversely with respect to the tracks of the first grid, elements maintaining the second substrate in a firm position so that each track of its grid remains distant from any of the tracks of the first grid as long as no pressure is exerted on at least one zone of the said second substrate, means for locating the tracks of the said grids brought into mutual contact when the said second substrate is subjected to the said pressure.

The device according to the invention, however, is distinguished from the similar devices of the prior art by the fact that the means of locating the tracks brought into mutual contact comprise two resistive voltage dividers, one of which is associated with the first of the two grids of tracks and the other with the second of these grids, each track of one grid being attached at one end to a point of the respective divider so that the ohmic resistance between this point and one of the ends of this divider is characteristic of the position occupied by this track within its grid, a first and a second switching element respectively associated with the first and the second voltage dividers and permitting one of the ends of the corresponding divider to be connected either to a voltage reference source in a first active switching state of each element, or to a voltage signal collection means in a second active state of this element, a third switching element permitting the other end of one or the other divider either to be connected to ground or to be disconnected from it, means for periodically controlling the said switching means, arranged in such a manner that, on the one hand, each of the said first and second switching elements is set to the first of these two active states when the other of these elements is in the second of these states, and conversely, and in such a manner that, on the other hand, the said third element connects the second end of each divider to ground when the first end of the divider is connected to the said reference voltage source, this ground connection being interrupted by this third element in the opposite case.

By virtue of the above structure, following a pressure exerted on any point of the surface corresponding to a zone of electric contact between at least two tracks of which each belongs to a separate grid, the collection means receives, alternately and in synchronism with the arrival of the said switching elements in one or the other active states, voltage signals the amplitude of which is successively characteristic in abscissa and in ordinate of the position of the tracks brought into mutual contact and consequently of the point on the surface on which the pressure has been exerted.

Thus, the two grids of tracks comprised by this device define in some way a system of coordinates permitting any point on the second substrate on which enough manual pressure is exerted for producing the electric contact of the tracks to be located the more easily and accurately as the number of tracks of each grid is large, that is to say that their width and the distance separating them on the respective substrate are small. These tracks will preferably haVe a width of the order of 1 to 2 mm and be spaced apart by 1 to 2/10 mm.

As a variant, they can also be of lesser width, corresponding for example to 0.5 mm, and the distance separating these tracks can be relatively large and even be as great as 1 mm.

The device according to the present invention thus proposes to apply a novel principle allowing all the disadvantages to be removed which can result from possible faults in quality and structure of the conductive coatings forming the tracks. Moreover, and advantageously, the disadvantages connected with the means to be used both for applying an "individualized" potential for each track under consideration of one of the grids and for measuring the potential carried by one such first track to a second track of the other grid brought into contact with this first track are easily suppressed due to the fact that the tracks of each grid are connected at one end to various points of a simple voltage divider, incorporated in the grid under consideration, such as reference resistance presenting at each point a well-defined value to which corresponds a likewise well-defined potential which can thus be used for characterizing the "geographic" position of the track connected to such a point and consequently the coordinate to which this track will correspond.

Advantageously, if the tracks of the grids are designed to form a system of rectilinear coordinates, orthogonal or not, the two resistances under consideration are resistances the ohmic value of which increases proportionally with their physical length, the tracks associated with each of these resistances being connected to various and equidistant points on the length of such resistances so that/the potential applied to each track of a grid will differ by an equal increment, more or less, with respect to the mean potential applied to the two adjacent tracks. Moreover, each of these reference resistances may play the role of collector of the potential signal carried by any of the conductive tracks belonging to a given grid which is associated with it and which has received this signal from any of the conductive tracks belonging to the other grid with which contact has been established by manual pressure exerted in the zone of intersection between the two tracks under consideration.

For this it is sufficient to have each reference resistance alternately play the role of voltage divider and of collector, each of these two functions being carried out from resistance to resistance at instances which are phase-shifted in time.

For the resistance to become a voltage divider one end of it is connected to ground, which establishes the origin of the system of coordinates already mentioned, and the other end to a direct-current potential with a predetermined maximum value.

This same resistance becomes a potential collector if its two ends are momentarily separated from ground and from the above source of potential. Any adequate measuring system like a simple voltmeter then allows the value of the potential carried towards this resistance to be "read", this value being an analog signal. Naturally, such a signal can be converted, if necessary, into a plurality of binary signals which can be utilized in an electronic analysis system using digital signals.

According to another particularly advantageous characteristic, and when the device according to the invention is more precisely designed to be used in combination with a screen consisting of a cathode ray tube or of a liquid-crystal display, for example, with a view to giving to the apparatus comprising such a screen instructions characterized by the location of corresponding information appearing at various points on the screen, the base substrates of the grids of tracks as well as these tracks are in particular transparent whilst the two reference resistances themselves may be of an opaque material because they will in fact be arranged outside the visual field of the screen. These resistances may be of any appropriate material presenting the required character of linearity with regard to the variation of their resistive value as a function of their length so that, for example, these resistances may consist of carbon or of graphite.

The conductive tracks coating each of the two substrates comprised by the device according to the invention will be obtained from a layer of metal oxide of the type already mentioned, with a particularly small thickness of the order of some tens of microns and originally deposited over the whole surface of the corresponding substrate. The tracks themselves are obtained by subsequently forming a plurality of grooves hollowed out of the total thickness of the coating, the size of which corresponds to the distance separating and electrically insulating two adjacent tracks and the groove-to-groove spacing of which is equal to the width of each track obtained increased by one groove width. Such grooves can be formed in any adequate manner and for example by local chemical corrosion, by mechanical machining, for example by notching with the aid of styli of very hard material, for example diamond or carborundum, or also by application of a laser beam. As a variant, it is possible to use quite a different appropriate technique and in particular to deposit the conductive tracks individually through a mask, the opaque portions of which allow grooves separating the tracks to be obtained. Whatever the means used, care must obviously be taken that the longitudinal edges of each track are as regular as possible.

Naturally, the invention can be applied in the same manner whether the conductive tracks of each grid are rectilinear or curved, the coordinates to which each track corresponds being fixed by the zone of the reference resistance to which the track is connected mechanically and electrically, and thus to the resistive value of the section of this resistance lying between its end and the said zone.

So that the electric contact between one or several track of the two grids of tracks only has a momentary character for as long as the zone under consideration of the respective substrates is subjected to a manual pressure, the second substrate of the device according to the invention consists of a dynamic membrane formed by a transparent polyester or polycarbonate film having a thickness of the order of a tenth of a millimeter and thus being relatively elastic. Between this dynamic membrane and the other substrate (the static membrane) which generally has a much greater thickness and indeed may consist of a plexiglass film with a thickness of 1 to 2 mm, depending on circumstances, generally cube-shaped and relatively hard polyester resin spacers are placed, the edges of which have a length of approximately 0.5 mm. These spacers are shaped and bonded, for example by serigraphy, directly onto the tracks coating the static membrane at a distance of approximately 5 mm from each other and arranged in orthogonal rows and columns, each four spacers thus supporting an elementary square portion of the dynamic membrane of a 5 mm a side, via the tracks of this membrane with which these spacers are in contact. Thus, the distance separating the tracks of the dynamic membrane from the tracks of the static membrane is 0.5 mm, that is to say very small.

It is thus easy manually to produce a local flexion of such a membrane which is sufficient to bring the part of the track or tracks affected by this flexion into contact with the tracks of the static membrane facing them. However, as the dynamic membrane is in a slightly stretched state and because it is supported on the static membrane via a plurality of spacers, such flexion can only be produced, between the spacers, by local and momentary elastic deformation of the dynamic membrane. This membrane will thus resume its first state by reacquiring a uniform distance from the static membrane as soon as the manual pressure producing its local deformation has ceased: the result is that the conductive tracks of each membrane, which have been brought into mutual contact by the flexion of the dynamic membrane, will also resume their distant position so that the potential signal which has been able to pass during this contact will then be interrupted.

Better understanding of the invention will be obtained by referring to the attached drawings, given by way of example, in which:

FIG. 1 is a descriptive view illustrating certain faults of the prior-art devices;

FIG. 2 is a plan view showing certain details of the device according to the invention;

FIG. 3 is a section view, on a larger scale, along III—III of FIG. 2;

Figure 4:
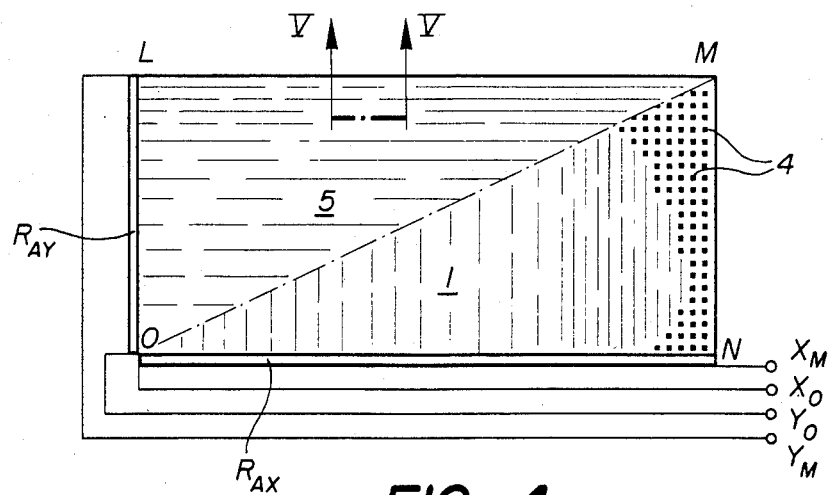
FIG. 4 is a plan view with a partial cut-away of a device accorording to the invention.

In the drawing (FIG. 1), R represents a coating of metal oxide, for example an indium oxide, a tin oxide or a mixture of these oxides, deposited in a thin layer, for example of the order of some tens of microns, on a substrate indicated diagrammatically by a rectangle in dot-dashed lines Q, which substrate is of an insulating material such as glass or plastic, for example a polycarbonate.

Along two edges adjacent to this coating R two electrodes $E_x$ and $E_y$ are arranged in electric contact with the coating itself and are designed for collecting the current signal which can be propagated in the coating R if a given potential is applied to it at one of its points $P_1$ or $P_2$ of the same ordinate $Y_p$ in the drawing. This signal may be collected at a terminal $S_x$ for the electrode $E_x$ and at the terminal $S_y$ for the electrode The structure just described reflects, very schematically the principle of operation of one of the known devices previously mentioned, namely the finding of a point $P_1$ or $P_2$ by successively measuring at the electrode $E_x$ for the x abscissa and at the electrode $E_y$ for the Y ordinates of the potential drop due to the ohmic resistance offered by the coating R to the current flowing from $P_1$ to $P_2$ to the electrode $E_x$ and to the electrode $E_y$.

Now, in such a structure, measuring the ordinate $Y_p$ of points $P_1$ and $P_2$, the value of which must be identical from point to point, generally provides quite different results for each of them because the Gaussian distribution of the electric field built up in the coating R clearly is not the same for point $P_1$ and for point $P_2$ because of the differences in position of each point in the X direction with respect to the two vertical edges of the coating R. Theoretically, these differences could be corrected more or less during the evaluation of the results of the measurement by the preliminary establishment of tables accounting accurately for the particular geometry of the coating R and of the respective location of the points $P_1$ and $P_2$. In practice, it can be seen nevertheless that the measuring error which it must be possible to correct in this manner is quite variable and even unpredictable if the performances obtained by carrying out a comparative test of several structures of the type illustrated, identical with respect to their general architecture and their particular dimensions, are compared. This is because it is impossible at this time to guarantee that the thickness of the coating obtained and its homogeneity from the chemical point of view are rigorously constant at any instant, particularly if the metal oxide under consideration is actually a mixture of several oxides, in spite of the progress made up to now in maintaining the uniformity of thickness and of quality of the metal oxide coating for the whole of the execution of the process of continuously producing a large quantity of substrate coated with such an oxide, of which the fraction subsequently utilized for each structure (such as in FIG. 1) is proportionally quite small.

It follows that despite all the care taken during the operations of depositing the metal oxide on its substrate, this deposit can have different characteristics, in places, than the optimum desired deposit.

A substrate such as substrate Q in the drawing, Therefore, can quite easily be covered with an oxide coating, the characteristics of which deviate from "normal" for example in zone Z. As a result, both the intrinsic resistivity of the metal oxide of this zone and possibly the thickness of this oxide, and therefore the electric resistance per surface unit of oxide, will have values which are often sufficiently different for the current signal likely to be received by the electrodes $E_x$ and $E_y$ to diverge greatly from the one it should be if the coating R were identical in thickness and quality over the whole extent of its surface. Since, moreover, the extent of a zone such as the zone Z mentioned and its shape and its location on the substrate Q clearly have a random character, it is clear that the impact of the existence of such zones could be quite different between a structure such as that of FIG. 1 and another similar structure, even if the latter belongs to one and the same production lot of such structures.

Thus, whatever the means used for compensating easuring errors inherent in the geometric shape of the coating and of the position of the point $P_1$ or $P_2$ in his coating, the measurement which can be obtained from the signal obtained at the terminals $S_x$ and $S_y$ will be ecessarily encumbered by an error which itself has a random character.

To date, no means are available which allow this major disadvantage in utilizing a metal oxide coatng as a current carrier to be seriously eliminated In detail, the present invention proposes to make coatings of this type operate essentially as potential carier and in this manner to reduce to a minimum the intensity and the size of the effective zone of influence of any curent, generally of parasitic nature, which may flow through the metal oxide coating under consideration.

For this purpose, it is proposed to replace the uniform coating R in FIG. 1 by a divided coating such as is shown in FIGS. 2 and 3 and which consists of a plurality of horizontal conductive tracks $c_l$ to $c_n$ having particularly small width, for example of the order of 1 mm and each two being separated by a groove r (FIGS. 2 and 3) which is very narrow, in particular of a width of 0.1 mm. As can be seen in the drawing (FIG. 3) the bottom of these grooves r actually consists of a part of the substrate Q so that the different conductive tracks $c_l$ to $c_n$ thus form a grid of tracks perfectly insulated from one another. These tracks and these grooves can be obtained, as already described, for example by an appropriate surface treatment, either chemically, mechanically or by laser, of a metal oxide layer uniformly covering all of the surface of a substrate such as the substrate Q, this treatment ensuring that a perfect uniformity in the width of each track will be obtained over its whole length, in 20 the width of the groove r contained between two adjacent tracks and in the state of the surface of the longitudinal edges of each track, appearing relatively plane and without significant roughness even at the microscopic level.

As can be seen in FIG. 2, the sub-division of the uniform coating of FIG. 1 into fine tracks transates into a fractional distribution between all tracks of interest of any zone Z with irregularity in the quality and/or thickness of the oxide coating. The essential advantages to be obtained from such fractional distribuion will be seen below.

The various tracks $c_l$ to $c_n$ are attached at their respective left-hand end to a resistance $R_A$, the resistive value of which increases linearly along its whole length. As already mentioned, such a resistance may c6nsist of a layer of carbon, deposited in the form of paint on the substrate Q after formation of the conductive tracks in such manner that a zone of these tracks is covered which is sufficient for providing homogeneous contact over the whole height of each track. The coating of this layer of carbon can have a width of approximately 2 mm. In the drawing, this width has not been shown to scale in order to facilitate understanding of the invention. Similarly, in practice the length of this resistance is chosen in such a manner that its two ends are perfectly flush with the lower edge of track $c_n$ and the upper edge of track $c_l$.

With such a basic structure it will be possible to polarize each track $c_l$ to $c_n$ with a different potential which will be characteristic of the location of the track under consideration within the grid of tracks formed by them. More accurately, by connecting the resistance $R_A$ to ground via its terminal A and by applying a direct-current potential $V_{max}$ to terminal B, the resistance $R_A$ will operate for each track $c_l$ to $c_n$ as a voltage divider in such a manner that the average line of each track carries a direct-current potential corresponding to the one present at the resistance $R_A$ at this line.

As the ohmic value of this resistance increases linearly from terminal A to terminal B, the value of the potential present at the average line of each track will also increase linearly from bottom to top in the drawing.

As the tracks are both equidistant and of the same width, the "mean" direct-current potential of each track will thus be different from the mean direct-current potential of the adjacent tracks by the same incremental value, more or less, depending on whether reference is made to the track immediately below or above each track under consideration.

Besides, if each track is considered by itself it will be seen that, if the average line is brought to a given potential, for example $V_{c4}$ for track $c_4$, the upper and lower edges of this track are at potentials which are different from $V_{c4}$ by a quantity more or less proportional to the difference of the ohmic value of resistance $R_A$ with respect to terminal A existing at the upper edge and the lower edge of the track $c_4$. If $V'_{c4}$ is the direct-current potential which can be measured along this upper edge and $V''_{c4}$ is the direct-current potential which can be measured along the lower edge, the following is necessarily obtained.

$$V'_{c4} < V_{c4} < V''_{c4}$$

These two edges of track $c_4$ are therefore at the same potential as the potential $V'_{c4}$ for the one and $V''_{c4}$ for the other.

Besides, considering that the width of this track and of all other tracks in the drawing is very small, the order of 1 to 2 mm, the equipotentials present in track $c_4$ are all parallel at the longitudinal edges of the track itself and regularly spaced except maybe in the part of the zone Z under consideration at the right-hand edge of this track. Because this zone part has a reduced size, any possible trouble resulting from this non-homogeneity is virtually negligible because the potential difference between the two longitudinal edges of the track $c_4$ also has a low value and consequently the current which can circulate between these two edges will itself be very low.

By way of example, the potential difference between the longitudinal edges of each track is approximately $6.10^{-2}$ Volt for a group of horizontal tracks $c_l c_n$ of 82 units which thus present a total height of approximately 90 mm, subjected under the conditions mentioned to a direct-current potential $V_m$ of 5 Volt. The current to which this potential difference can give rise is thus so weak that the possible significance of the error resulting from its flow in the part of the zone Z of interest to track $c_4$ becomes negligible.

Naturally, what has been said by referring exclusively to track $c_4$ is also applicable, with the necessary changes, to each other track in the grid of FIG. 2.

Considering the above, if the arrangement of FIG. 2 is completed by adding a flexible and insulating film such as film L, shown by a broken line and extending vertically and covered on one side with a metal oxide coating similar to the one of tracks $c_l$ to $c_n$ and if this film is kept at a distance from but at the same time sufficiently close to these tracks in order to be capable of being brought into contact by local flexion of this film, each part of its coating being successively opposite to the various tracks $c_l$ to $c_n$, the various potentials can then be measured, for example by a voltmeter connected to the lower end of the film l, to which the tracks $c_l$ to $c_n$ are brought by virtue of the resistance $R_A$. Thus, if the film l is at a known distance X from the point 0, and if on this film a potential is obtained the value of which corresponds to the position of the track $c_1$ to $c_n$ with which this film is in contact, the ordinate Y of the track under consideration will also be known with respect to this same point 0 so that the contact zone of this track h the film is thus perfectly well defined.

At this point, it should be noted that during the measurement of the potential on the film l, for example at its lower end, virtually no current flows apart from stray currents and measurement currents, either in the track $c_l$ to $c_n$ under consideration or in the film l itself so that the adverse influence which could possibly have been produced for example by any irregularity in the oxide coating of the tracks $c_l$ to $c_n$ is completely eliminated. Indeed, due to the fact also that the apparatus d for measuring the potential value is by its nature highly resistive, it will be realized that the tracks $C_l$ to $c_n$ themselves present a resistance with a significant ohmic value since this can be between approximately 6 KOhm for a track $c_l$ to $c_n$ with a length of 190 mm having good characteristics of transparency, and approximately 46 KOhm for a similar track with inferior optical qualities. In this respect, it will be noted that the value of the surface resistance of these types of coatings is approximately 300 Ohm in the first case and approximately 800 Ohm in the second case. To the ohmic resistance of any activated track $c_l$ to $c_n$ clearly that of the coating of the film l must be added which will be of the same order of magnitude. Indeed, with more precise reference to this film, the length of which is about 90 mm, the ohmic resistance will also be high, in the two preceding hypotheses, since it becomes approximately 3 KOhm in the first and approximately 22 KOhm in the second hypothesis.

By extension of the above, it can be seen that, using two systems such as that of FIG. 2 arranged one upon the other but one oriented at right angles to the r so that the respective tracks are slightly distant substrate to substrate but still able to be individually brought into contact with one or several tracks of the other substrate in the manner described by referring to film l of FIG. 2, a proper system of orthogonal coordinates is created which allows any zone to be located horizontally and vertically in which contact has been stablished between the tracks deposited on different substrates. It will be seen below how the device according to the invention allows the X coordinate and the Y coordinate to be measured successively at any point in the system at which an electric link has been allowed to occur between two orthogonal tracks.

FIG. 4 accurately shows a plan view, with a partial cut-away, of such a device designed to be applied on top of a rectangular display, for example an LCD liquid-crystal display which the device is required to cover in its totality.

This device comprises a static membrane 1, for example formed by a plexiglass film with a thickness of about 2 mm, constituting the substrate on which has been deposited a coat of metal oxide such as indium oxide, tin oxide or a mixture of these oxides, which coat has been cut as a result of the previously described measure into a plurality of vertical conductive tracks 2 the thickness of which is of the order of 10 to 20 microns and the width of which, uniform for all the tracks, is approximately one millimeter. Grooves 3 with a width of a tenth of a millimeter separate and insulate each track 2 from those immediately adjacent. In FIG. 4, drawn on a relatively reduced scale, the tracks 2 have not all been desginated and are shown by some vertical lines. In reality, these extend over the whole length of the membrane 1 which, as can be seen, is of rectangular shape and is delimited in the drawing by the rectangle L M N O. In the present case, this rectangle in reality has a length LM or NO of 190 mm and a width OL or NM of approximately 90 mm. All the tracks carried by the static membrane 1 are integral and electrically linked by their particular oxide coating to a linear resistance $R_{AX}$ consisting of a layer of carbon or graphite with a width of approximately 1.2 mm, deposited for example by serigraphy and presenting a resistance with a global value which is relatively high, for example of the order of some 30 KOhm. The right-hand and left-hand ends in the drawing of the resistance $R_{AX}$ are connected to two terminals, $X_m$ for the first end and $X_0$ for the second via connections of very low resistance, for example of silver, in such a manner that if the terminal $X_m$ has applied to it a given direct-current potential $V_M$ for example of 5 Volt, and the terminal $X_O$ is put to ground T, the voltage drop due to these connections is negligible and practically all the potential difference present between these terminals is available at the two ends of the resistance $R_{AX}$.

The device shown also comprises a very large number of spacing rods 4 represented by small points on the right-hand lower part of the rectangle L M N O of FIG. 4 and each consisting of a small cube of 0.5 mm per side of polyester resin. These spacers have been deposited by serigraphy on the conductive tracks 2 of the static membrane 1, aligned in orthogonal rows and columns with a row-to-row or column-to-column separation of approximately 5 mm.

The spacers 4 are designed to support a dynamic membrane 5, also of rectangular shape, preferably of a transparent soft and relatively elastic plastic material, for example a polyester or a polycarbonate, with a thickness of the order of 1.10 mm, the lower face of which in the drawing (FIG. 4) is covered by a plurality of conductive tracks 6 having a width, thickness and chemical composition which are identical in all points to those of the tracks 2 already mentioned and obtained, like those tracks, by arranging a plurality of grooves with an approximate width of 0.1 mm in a uniform conductive coating In the drawing (FIG. 4) only some tracks 6 have been shown by horizontal lines whilst in reality these tracks cover the whole dynamic membrane 5 in close approximation to each other in the manner shown diagrammatically in FIGS. 2 and 3.

Figure 5:
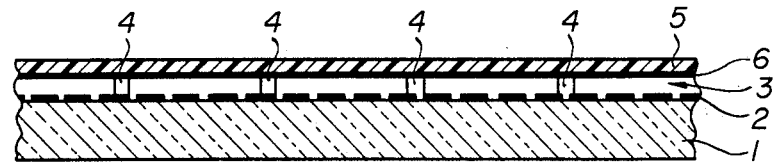
FIG. 5 is a section along V—V of FIG. 4 on an enlarged scale.

As can be seen in FIG. 5, the spacers 4 are in contact via their upper surface with a track 6 of the dynamic membrane 5 It will be noted that this track 6, just like all the similar tracks projecting on the lower face of the membrane 5 extends parallel to the longitudinal sides LM and ON of the rectangle L M N O of FIG. 4, over the whole length of this rectangle. Taking account, on the one hand, of the distance separating each horizontal row of spacers 4, and on the other hand, of the width of the tracks 6, only one track 6 of all five will thus be supported by the spacers 4.

In the manner of the tracks 2 covering the static membrane 1, the tracks 6 are mechanically and elastically joined at their left-hand end in the drawing to equidistant points on a second linear resistance $R_{AY}$, having the same structural characteristics as those of resistance $R_{AX}$ already mentioned but with a proportionally lower ohmic value of, say, approximately 16 KOhm since it is shorter, of the order of 90 mm. The lower end of this resistance and its upper end are joined by connections with low ohmic resistance, for example of silver, to terminals $Y_O$ and $Y_M$, respectively, also in such a manner that the total potential difference which can be applied across these terminals is available across the resistance $R_{AY}$.

As can be seen in the drawing, the resistances $R_{AX}$ and $R_{AY}$, which are generally opaque, extend to the end of the field L M N O enclosed by the tracks 2 and 6 of the device. The same applies to the connections linking these resistances to the terminals $X_O$, $X_M$, $Y_O$ and $Y_M$ of which, besides, there are only four for a number of conductive tracks, vertical and horizontal, which is particularly high without complicating the structural level of the device shown. If such a device is designed to be placed into a housing of which it is to form an observation window delimited by an opaque frame surrounding the edges L M N O of the field of tracks 4 and 6, for example as in the case of the portable computer described in Application EP No. 0 053 061, it can be seen that both the resistances $R_{AX}$ and $R_{AY}$ and their respective connections can easily be placed under this housing frame, the width of which frame can, moreover, be quite narrow.

As will be seen, the reduced number of such connections is nevertheless sufficient for allowing any point which is located within the field L M N O and on which a manual pressure has been exerted which is capable of bringing one track of the dynamic membrane 5 into contact with the track of the static membrane 1, extending in particular at right angles to the point above, to be located with particular accuracy.

Figure 4A:
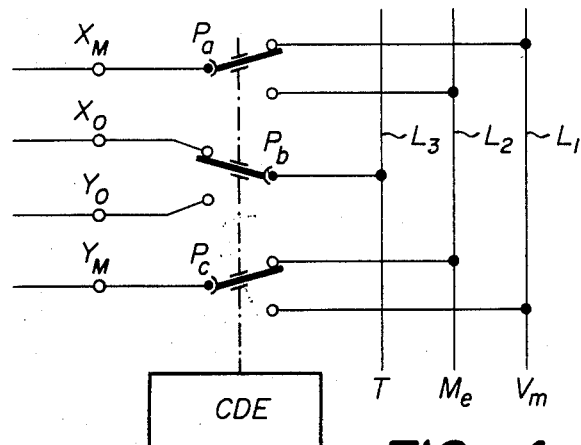
FIG. 4a shows an electric diagram.

For this purpose, it is sufficient to complement the device of FIG. 4 by a circuit such as the one shown in FIG. 4a to which it may be connected via the terminals $X_M$, $X_O$, $Y_O$ and $Y_M$. At this point it should be noted that this circuit has been shown here in its purely functional aspect and that it is obvious that it can be implemented in a more sophisticated electronic form by the expert in the field. Such a circuit, however, must have three gates $P_a$, $P_b$ and $P_c$, shown here by bipolar switches which can be activated in synchronism and periodically by any appropriate electronic means, functionally equivalent to the electro-mechanical system CDE shown and causing the three gates to flip simultaneously into one or the other of their two stop positions of switching. If the elements $P_a$, $P_b$ and CDE are implemented by electronic means, the switching of the three gates would take place, for example, every 1/16th of a second.

As can be seen, the terminal $X_M$ can be alternately linked by the gate $P_a$ to a line $L_1$ connected to a source, not shown, of direct-current potential $V_M$ and to a line $L_2$ joined to a potential sensor which is also not shown but indicated by the reference $M_e$. If the device described is designed for controlling an electronic analysis instrument utilising digital signals, such a sensor comprises a circuit transforming the absolute value of the potential sensed on the line $L_2$ into a relative value with respect to the maximum potential $V_M$ of the line $L_1$ and a transducer which encodes this relative value, which is an analog value, into a digital value.

In an analogous manner, the terminal $Y_M$ may be alternately linked by the gate $P_c$ to the line $L_2$ and to the line $L_1$ for the same purpose as that mentioned above Nevertheless, it will be noted that the links established between the output terminals of gate $P_c$ and the lines $L_1$ and $L_2$ are inverted with respect to the links connect the output terminals of gate $P_a$ and these same lines $L_1$ and $L_2$. It follows that, if the terminal $X_M$ is connected to the line $L_1$, the terminal $Y_M$ will in contrast be connected to the line $L_2$, and conversely. With regard to the terminals $X_O$ and $Y_O$ of the resistances $R_{AX}$ and $R_{AY}$ these can be alternately connected by the gate $P_b$ to the line $L_3$ which is connected to ground T.

Referring again to the drawing in FIG. 4 it can be seen that, if the resistance $R_{AX}$ or $R_{AY}$ is connected to the line $L_1$ by the gate $P_a$ or $P_c$ to which its terminal $X_M$ or $Y_M$ is connected, the same resistance is grounded by its other terminal $X_O$ or $Y_O$. During this time, the potential of the other resistance is only defined by the value of the potential which can be applied to it by one or other of the tracks to which it is connected, that is to say only by the track or tracks of the corresponding grid which are in contact with one or several tracks belonging to the other grid the resistance $R_{AX}$ or $R_{AY}$ of which is momentarily connected to the lines $L_1$ and $L_3$.

Thus, due to the periodic switching produced by the CDE system and each time a manual pressure is exerted on a precise point on the dynamic membrane, the line $L_2$ receives alternately, for example every 1/16th of a second, a signal which is characteristic of the position of this point according to two orthogonal axes which are parallel to the tracks of the two grids, with respect to the end of the two resistances $R_{AX}$ and $R_{AY}$ located at the level of point 0 (FIG. 4) which, therefore, constitutes the origin of a system of coordinates allowing the position of the point of the membrane on which the said manual pressure is acting to be accurately defined.

Taking account of the relatively small width of the tracks covering both the static membrane and the dynamic membrane, and of their proximity, it is clearly not impossible that, by exerting a manual pressure on a weak zone of the dynamic membrane, more than one track of this membrane can be brought into contact with one or two neighboring tracks on the static membrane. In such a case, the potential signal received by the line $L_2$ will then correspond to a signal having an intermediate value between the values which would have been provided by each of the tracks of the same grid of tracks if it had been obtained individually.

According to one embodiment of the device described and with the purpose of reducing any capacitive effect between tracks, particularly for preventing any delays in the production and/or evaluation of the potential signals received by the line $L_2$ (FIG. 4a), the tracks belonging both to the static membrane 1 and the dynamic membrane 5 are of particularly small width, of the order of 0.5 mm, the grooves separating each track being proportionally wider, in contrast, of the order of 1 mm. These tracks nevertheless have a chemical structure which is identical to that described with reference to FIGS. 2 and 5. They can be obtained by the processes already mentioned.

It will also be noted that, in application, the device described has been found to be particularly reliable, the metal oxide coating forming each track displaying a very high wear resistance. Indeed, these tracks have continued to provide a satisfactory electric contact between tracks of different grids at all points of the field covered by these tracks, even after hundreds of thousands of operations of the device by manual stress exerted each time on one and the same point of the dynamic membrane.

Finally, although neither the preceding description nor the drawings to which it refers have considered this in detail, it is clear that the static membrane 1 (FIG. 5) of the device according to the invention can be formed by a plate which is independent of the apparatus with which this device is designed to be associated, for example in the case of a liquid crystal display, but that it can also be an integral part of an element of this apparatus, for example if this apparatus has a cathode ray tube forming a video screen, where the static membrane can be directly formed by the screen part of such a tube: the conductive tracks of this membrane will then be obtained by a metal oxide deposit effected on the tube itself.

Naturally, the invention is not limited to what has been represented or described: in particular, it will be understood that the device under consideration can be such that the tracks of the static and dynamic membranes do not intersect in orthogonal manner but at any angle whatever. Similarly, a structure can be envisaged in which the tracks of one or the other membrane or of both are not rectilinear but extend along curved lines. Indeed, in each of the these cases it is sufficient for each grid formed by these tracks to be linked to a particular calibrated resistance, of the type of those mentioned with reference to FIG. 4, at points on this resistance which are characteristic of the position which it is desired to attribute to each of the tracks of one grid or the other. Besides, the resistive coating forming these resistances could also, if necessary, extend in accordance with a profile which is not rectilinear but curved.

The possible applications of the device described can clearly differ from those hitherto considered. Thus, such a device could also be used in association with a radio or television set as control keyboard for such sets both for selecting different stations and for effecting progressive regulation of the various other operating parameters of these sets, such as the sound intensity, variation of bass and treble, control of the balance of stereo sound, brightness of a television image, contrast, control of basic colors or of the linearity of such an image, for example.

Such a device can also be used as the keyboard of a musical instrument, especially for generating sounds electronically, for example by allocating the identity of the notes of one scale in their habitual order and over several adjacent octaves to the successive vertical tracks and the identity of these same notes but changed by one half note higher (sharp notes) or lower (flat notes) from track to track to the horizontal tracks.

The abovementioned simple examples clearly show how the device according to the invention is generally applicable and can thus be used for applications as numerous as they are varied.

We claim:

1. Device for forming signals which are characteristic of the position of a point determined on a surface, especially by pressure exerted at right angles to this point, comprising a first insulating substrate (1) covering the surface, a first grid of conductive tracks (2) placed on one face of this first substrate and spaced apart from each other, a second substrate (5) of flexible insulating material, covering the face of the first substrate carrying the said conductive tracks (2), a second grid of conductive tracks (6) placed on the face of the second substrate located opposite to the first grid of tracks (2), the tracks of this second grid being spaced apart from each other and extending transversely with respect to the tracks of the first grid, elements (4) maintaining the second substrate in a firm position so that each track of its grid remains distant from any of the tracks of the first grid as long as no pressure is exerted on at least one zone of the said second substrate, means for locating the tracks of the said grids brought into mutual contact when the said second substrate is subjected to the said pressure, wherein these means comprise:

two resistive voltage dividers ($R_{AX}$, $R_{AY}$), one of which ($R_{AX}$) is associated with the first of the two grids of tracks and the other ($R_{AY}$) is associated with the second of these grids, each track of one grid being attached at one end to one point of the respective divider in such a manner that the ohmic resistance between this point and one of the ends of this divider is characteristic of the position occupied by this track in its grid, first and a second switching elements ($P_a$, $P_c$) respectively associated with the first and second voltage dividers and permitting one of the ends of the corresponding divider to be connected either to a reference voltage ($V_m$) in a first active switching state of each element, or to a voltage signal collection means ($L_2$, $M_e$), in a second active state of each element, a third switching element ($P_b$) permitting the other end of one or the other divider to be connected to ground (T) or to be disconnected from it, elements (CDE) for periodically controlling the said switching elements ($P_a$, $P_b$, $P_c$), arranged in such a manner that each of the said first ($P_a$) and second ($P_c$) switching elements is set to the first of these two active states when the other of these elements is in the second of these states, and conversely, and in such a manner that said third element ($P_b$) connects the second end of each divider to ground (T) when the first end of the divider is connected to the said reference voltage sources ($V_m$), this ground connection being interrupted by this third element ($P_b$) when the first end of the divider is connected to said voltage signal collection means ($L_2$, $M_e$), the whole being arranged in such a manner that, following a pressure exerted on any point of the said surface corresponding to a zone of electric contact between at least two tracks of which each belongs to a separate grid, the said collection means ($L_2$, $M_e$) receives, alternately and in synchronism with the arrival of the said switching elements ($P_a$, $P_b$, $P_c$) in one or the other active states, voltage signals the amplitudes of which are successively characteristic of the abscissa and ordinate of the position of the said tracks and consequently of the said point of the surface.

2. Device as claimed in claim 1, wherein the resistive dividers ($R_{AX}$, $R_{AY}$) each consist of a coating of a resistive material applied to the first (1) and to the second (5) substrate, respectively for the first ($R_{AX}$) and for the second ($R_{AY}$) dividers, and covering a part of the length of one of the ends of the tracks (2, 6) placed on the corresponding substrate.

3. Device as claimed in claim 2, wherein the resistive coatings ($R_{AX}$, $R_{AY}$) associated with the two grids of tracks are disposed on at least parts of the lengths of the edges of the field enclosed by the tracks of these grids.

4. Device as claimed in claim 3, wherein the two resistive coatings ($R_{AX}$, $R_{AY}$) extend respectively along two sides adjacent to the said field, that each of their ends is connected to respective switching elements ($P_a$, $P_b$, $P_c$) by low-impedance connections, the connection associated with a first end of each coating and close to the opposite end of the other coating being connected to one or to the other, respectively, of the two input terminals of the third switching element ($P_b$), this coating end thus constituting an origin (O) of the system of coordinates of abscissa and ordinate formed by the two grids of tracks, and the associated connection of the second end of each coating being connected to the first switching element ($P_a$), for one of the coatings ($R_{AX}$), and to the second ($P_c$) of these elements for the other one ($R_{AY}$).

5. Device as claimed in claim 1, wherein the first substrate (1) consists of the said surface.

6. Device as claimed in claim 1, wherein the second substrate (5) is an elastic membrane which is extended above the substrate (1), this first substrate presents a plurality of spacing projections (4) standing from place to place on certain tracks (2) of the first grid and jointly with these, and the said membrane (5) is supported on the said spacers via at least certain tracks (6) of the second grid, these spacers subdividing the surface of this membrane into a plurality of adjacent elements.

7. Device as claimed in claim 6, wherein the spacing projections (4) are arranged in equidistant and orthogonal rows and columns, the said membrane elements each presenting a generally square form.

8. Device as claimed in claim 6, wherein the spacing projections (4) take the form of plastic sprues deposited by serigraphy.

9. Device as claimed in claim 8, wherein each sprue has a generally cubic shape.

10. Device as claimed in claim 9, wherein the length of the edge of the cube forming each sprue is less than the width of the tracks.

11. Device as claimed in claim 1, wherein each conductive track is formed by a metal oxide coating, wherein this coating consists of a portion of a uniform deposit (R) originally covering the whole surface of the respective substrate (Q) and divided into tracks ($c_1$ to $c_n$) by machining grooves (r) into the thickness of the deposit, the depth of the said grooves being such that their bottom consists of a part of the said substrate (Q).

12. Device as claimed in claim 11, wherein the grooves are obtained by chemical machining, mechanical machining or by laser machining.

13. Device as claimed in claim 1, wherein the substrates, the conductive tracks and the spacing projections are transparent.

14. Device as claimed in claim 3, intended for being superimposed on a display and to appear in a window of a housing, wherein the said resistive coatings are masked by the edges of the housings delimiting the said window.

15. Device as claimed in claim 6, wherein the substrates, the conductive tracks and the spacing projections are transparent.

16. Device as claimed in claim 13, intended for being superimposed on a display and to appear in a window of a housing, wherein the said resistive coatings are masked by edges of the housings delimiting the said window.

* * * * *